United States Patent
Wang et al.

(10) Patent No.: US 12,338,995 B2
(45) Date of Patent: Jun. 24, 2025

(54) EMISSION MONITORING AND CONTROL OF FLARE SYSTEMS

(71) Applicant: Baker Hughes Holdings LLC, Houston, TX (US)

(72) Inventors: Anan Wang, Billerica, MA (US); Chong Tao, Billerica, MA (US); Aniruddha Weling, Wayland, MA (US)

(73) Assignee: Baker Hughes Holdings LLC, Houston, TX (US)

( * ) Notice: Subject to any disclaimer, the term of this patent is extended or adjusted under 35 U.S.C. 154(b) by 465 days.

(21) Appl. No.: 17/713,098

(22) Filed: Apr. 4, 2022

(65) Prior Publication Data

US 2022/0325887 A1    Oct. 13, 2022

Related U.S. Application Data

(60) Provisional application No. 63/171,034, filed on Apr. 5, 2021.

(51) Int. Cl.
*F23G 7/06* (2006.01)
*F23G 7/08* (2006.01)
*G06N 20/00* (2019.01)

(52) U.S. Cl.
CPC .............. *F23G 7/085* (2013.01); *F23G 7/065* (2013.01); *G06N 20/00* (2019.01)

(58) Field of Classification Search
CPC .......... F23G 7/085; F23G 7/065; G06N 20/00
USPC ........................................................... 431/5
See application file for complete search history.

(56) References Cited

U.S. PATENT DOCUMENTS

| | | | |
|---|---|---|---|
| 6,216,091 B1 | 4/2001 | Hammond | |
| 2011/0195364 A1 | 8/2011 | Tullos | |
| 2015/0260397 A1 | 9/2015 | Talasila et al. | |
| 2017/0370579 A1* | 12/2017 | Johnson | F23G 7/065 |
| 2019/0003707 A1 | 1/2019 | Shurtleff et al. | |

(Continued)

FOREIGN PATENT DOCUMENTS

JP    2010078594 A    4/2010

OTHER PUBLICATIONS

International Search Report and Written Opinion received for PCT/US2022/071525, mailed on Jul. 14, 2022, 8 pages.

*Primary Examiner* — Avinash A Savani
(74) *Attorney, Agent, or Firm* — Mintz, Levin, Cohn, Ferris, Glovsky and Popeo, P.C.

(57) ABSTRACT

In an embodiment, a method of controlling flaring of a combustion gas including a flare gas, a supplemental fuel gas, and an assist gas is provided. Models estimating, based on flow rates and in-situ speed of sound measurements in the gases, net heating value of the combustion gas within a flare combustion zone, combustion efficiency of the combustion gas, and smoke yield of the combustion gas are maintained. The method also includes receiving measurements of the gas flow rates and determining set points for flow rates of the fuel gas and/or the assist gas based upon the models that achieve a target combustion efficiency. When a difference between a determined set point and its corresponding flow rate for the fuel gas and/or the assist gas is greater than a corresponding predetermined tolerance amount, that flow rate can be adjusted to reduce the determined difference below the predetermined tolerance amount.

16 Claims, 7 Drawing Sheets

(56) References Cited

U.S. PATENT DOCUMENTS

2019/0242575 A1\* 8/2019 Fisher ................. F23L 7/005
2020/0386404 A1\* 12/2020 Kraus ................. G06V 10/25

\* cited by examiner

EMISSION MONITORING AND CONTROL OF FLARE SYSTEMS

CROSS-REFERENCE TO RELATED APPLICATIONS

This application claims the benefit of U.S. Provisional Patent Application No. 63/171,034, filed on Apr. 5, 2021, and entitled "Flare Control With Real-Time Combustion Efficiency Monitoring," the entirety of which is incorporated by reference herein.

BACKGROUND

Flaring is a process of combusting hazardous gases often performed in industrial processes, such as upstream exploration and production, midstream natural gas processing, and/or downstream petrochemical refinery plants. In some cases, flaring can be employed to dispose of unwanted or excess process gases during normal operation (e.g., excess hydrocarbon gases resulting from crude oil extraction). In other cases, flaring can be performed for safety (e.g., unplanned over-pressurization) and/or maintenance. Other gases can also be added to the flare gas (e.g., a supplemental fuel gas, and/or an assist gas such as air/steam) in order to prevent smoke formation and/or promote more complete combustion.

However, flaring represents one of the largest stationary sources of pollutants, such as volatile organic compounds (VOCs) and/or greenhouse gases such as methane ($CH_4$). Around 150 billion cubic meters of natural gas is flared globally every year, which results in emission of 400 million tons of $CO_2e$, along with 8 million tons of soot (black carbon) from the un-combusted portion of these flares.

SUMMARY

In order to comply with regulatory requirements and/or optimize flare operation, it is common to monitor flare emissions.

In one aspect, emission monitoring of flares can be performed continuously using in-situ laser-based fluorescence and optical absorption analyzers, Fourier Transform Infrared (FTIR) spectrometers, passive/active infrared imagers, or other specialized continuous emissions monitoring systems (CEMS) equipment. However, such approaches can be impractical and prohibitively expensive. Notably, a significant majority of upstream flares on offshore platforms and wellheads can lack the infrastructure needed to meter flare gas flow or monitor its composition and flare emissions.

Instead, many flare operators employ static flare emission modeling, where a design model of a combustion source, such as a flare, is used to determine how much pollutant gas is released from flaring. The AP-42 method ("Compilation of Air Pollutant Emissions Factors"), published by the US Environmental Protection Agency (EPA), and flare tip design-based combustion efficiency (CE) are examples of models that are used to report pollutant emissions based on flare gas flow. That is, a quantity of pollutant released in the atmosphere is related to the flow of gas being combusted.

However, static flare design models rely solely upon static inputs and do not account for changes in environmental conditions (e.g., crosswind speed), or changes in process conditions (e.g., flare gas composition, flare gas pressure, or flare gas temperature) on CE. These changes can introduce significant and undesirable error into predicted emissions from of static flare design models.

In another aspect, multi-spectral imaging, based on passive radiometry, can be employed for flare emission monitoring. In general, the vented flare gas and/or its combustion products absorb light at a unique combination of frequencies (a unique spectrum) that can be detected. Multi-spectral imaging is a technique that acquires pictures of the open flame across many narrow spectral bands within the electromagnetic spectrum (e.g., visible, near-infrared, mid-infrared, etc.) Each pixel within an image can be analyzed using radiometric models to measure absorption spectra of components combusted within the flare and quantify the concentration of these components. However, while multi-spectral imaging can provide a direct measure of emissions, multi-spectral cameras can be relatively complex, expensive and are not commonly employed. Furthermore, acquisition of images using multi-spectral imaging can be limited by weather conditions, preventing reliable 24/7 combustion monitoring.

In a further aspect, downstream flares in petrochemical plants and refineries can be equipped with metering equipment for measuring flow of flare gas and assist gases (e.g., steam, air, etc.) Steam/air can be added to the combustion zone of flares to reduce visible smoke emissions by providing turbulence and adequate oxygen for combustion of heavier hydrocarbons. While online composition/heat content analyzers (e.g., Gas Chromatographs (GC), Mass Spectrometers (MS), and calorimeters) can also be present, there is no real-time CE monitor available to control assist gas and/or supplemental fuel gas flow to achieve complete combustion of the flare gas.

In general, systems and methods are provided for online monitoring of combustion efficiency of a flare gas combusted in a flare stack and control of gas flows (e.g., at least one of a supplemental fuel gas or an assist gas) to achieve a target combustion efficiency. As discussed in greater detail below, models are employed to estimate net heating value in a combustion zone ($NHV_{CZ}$), combustion efficiency (CE), and smoke yield (SY) based upon a variety of flare operating parameters. Examples of these parameters can include but not are limited to, one or more of the flare gas flow, the supplemental fuel gas flow, the assist gas flow, pressure, temperature, wind speed, speed of sound in the flare gas, and flare gas composition (if available). These models can be further used to determine set points for controlling the flow of the supplemental fuel gas and/or the assist gas that achieve a target combustion efficiency (CE).

The models can estimate the net heating value ($NHV_{CZ}$) based upon in-situ speed of sound (SOS) measured in the flare line by an ultrasonic flow meter. Ultrasonic flow meters can be used over a wide range of operating conditions, allowing real-time measurements of $NHV_{CZ}$ based on sound speed that has been shown to be about ±5% accurate. Furthermore, ultrasonic flow meters can reduce the latency of BTU measurements as compared to online analyzers such as gas chromatographs, which makes real-time control possible. Notably, flaring is a complex process with wide variation in the vent gas flow, chemical make-up, tip geometry, assist configuration, and operating conditions, as well as time delays inherent in the response time of online meters, analyzers, and control valves. Therefore, the ability to accurately estimate combustion efficiency (CE) based on routinely available measurements to enable feedback control of assist steam/air or supplemental fuel gas in real-time represents a significant improvement in flaring technology.

In an embodiment, a method of controlling a flare is provided. The method can include maintaining, by a memory a first model configured to estimate a net heating value of a combustion gas within a combustion zone of a flare including a flare gas, a supplemental fuel gas, and an assist gas, a second model configured to estimate a combustion efficiency of the combustion gas, and a third model configured to estimate a smoke yield resulting from combustion of the combustion gas. Each of the first, second, and third models can be based on at least volumetric flow rates of the flare gas, the supplemental fuel gas, and the assist gas. The method can also include performing, by at least one processor in communication with the memory, a plurality of operations. The operations can include receiving measurements of the volumetric flow rate of the flare gas, the supplemental fuel gas, and the assist gas. The operations can further include receiving, from the memory, the first, second, and third models. The operations can also include determining a set point for respective volumetric flow rates of at least one of the supplemental fuel gas or the assist gas, based upon the first model, the second model, and the third model, that achieves a target combustion efficiency. The operations can additionally include determining a difference between each determined set point and its corresponding measured volumetric flow rate for the supplemental fuel gas and the assist gas. When a determined difference is greater than a corresponding predetermined tolerance amount, the operations can additionally include outputting at least one command signal operative to command a flow regulator to adjust the volumetric flow rate of at least one of the supplemental fuel gas, or the assist gas to reduce the determined difference below the predetermined tolerance amount.

In another embodiment, the assist gas can be steam or air.

In another embodiment, the target combustion efficiency at the determined set points can be a maximum combustion efficiency.

In another embodiment, at least one of the smoke yield estimated according to the third model or the net heating value estimated according to the second model at the determined set points satisfies a predetermined constraint.

In another embodiment, at least one of the volumetric flow rate of the supplemental fuel gas or the volumetric flow rate of the assist gas can be constrained within a predetermined range.

In another embodiment, the first model can be further based upon a speed of sound in the flare gas, a pressure of the flare gas, and a temperature of the flare gas.

In another embodiment, the second and third models are based upon the net heating value estimated by the first model.

In another embodiment, the third model can be selected, by the at least one processor, from an empirical model or a non-parametric machine learning model.

In an embodiment, a system for controlling a flare is provided. The system can include a memory and at least one processor. The memory can be configured to maintain a first model configured to estimate a net heating value of a combustion gas within a combustion zone of a flare including a flare gas, a supplemental fuel gas, and an assist gas, a second model configured to estimate a combustion efficiency of the combustion gas, and a third model configured to estimate a smoke yield resulting from combustion of the combustion gas. Each of the first, second, and third models can be based on at least volumetric flow rates of the flare gas, the supplemental fuel gas, and the assist gas. The at least one processor can be in communication with the memory and configured to perform a plurality of operations. The operations can include receiving, from the memory, measurements of the volumetric flow rate of the flare gas, the supplemental fuel gas, and the assist gas. The operations can also include receiving the first, second, and third models from the memory. The operations can additionally include determining a set point for respective volumetric flow rates of at least one of the supplemental fuel gas or the assist gas, based upon the first model, the second model, and the third model, that achieves a target combustion efficiency. The operations can further include determining a difference between each determined set point and its corresponding measured volumetric flow rate for the supplemental fuel gas and the assist gas. When a determined difference is greater than a corresponding predetermined tolerance amount, outputting at least one command signal operative to command a flow regulator to adjust the volumetric flow rate of at least one of the supplemental fuel gas or the assist gas to reduce the determined difference below the predetermined tolerance amount.

In another embodiment, the assist gas can be steam or air.

In another embodiment, the target combustion efficiency at the determined set points can be a maximum combustion efficiency.

In another embodiment, at least one of the smoke yield estimated by according to the third model or the net heating value estimated according to the second model at the determined set points satisfies a predetermined constraint.

In another embodiment, at least one of the volumetric flow rate of the supplemental fuel gas or the volumetric flow rate of the assist gas can be constrained within a predetermined range.

In another embodiment, the first model can be further based upon a speed of sound in the flare gas, a pressure of the flare gas, and a temperature of the flare gas.

In another embodiment, the second and third models are based upon the net heating value estimated by the first model.

In another embodiment, the third model can be selected, by the at least one processor, from an empirical model or a non-parametric machine learning model.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore, should not be considered as limiting the scope of the disclosure.

DETAILED DESCRIPTION

Combustible gases, referred to as flare gases, are often burned in industrial operations for disposal and/or safety. Emissions from this combustion are commonly monitored for regulatory compliance, amongst other reasons. It can be desirable to control flaring in order to optimize combustion efficiency, a measure of how well the heat content of a fuel is converted into useful heat energy during combustion. However, existing systems configured to directly measure the combustion efficiency of a flare can employ active or passive optical imaging techniques, which are limited under adverse weather conditions. Thus, these existing systems may be unable to provide reliable 24/7 measurements of combustion efficiency for use in flaring control. Accordingly, improved systems and methods for flare emissions monitoring and control are provided. Models are employed to estimate parameters such as combustion efficiency, smoke yield, and net heating value of a combusted flare gas. These models employ live (e.g., real-time) measurements of process conditions (e.g., gas flow rates, composition, etc.) and environmental conditions (e.g., pressure, temperature, crosswind speed, etc.) as inputs. The models can be further used to determine set points for the flow rates of supplemental fuel gas and/or assist gas that optimize combustion efficiency. Beneficially, these models are not subject to weather limitations, and are always available. Thus, the set points determined by the models can be suitable for use in controlling the flow rates of the supplemental fuel gas and/or assist gas to achieve optimized combustion efficiency.

Embodiments of sensing systems and corresponding methods for monitoring and controlling emissions of a hydrocarbon gas are discussed with specific reference to combustion of a flare gas. However, embodiments of the disclosure can be employed to monitor and control emissions of any gas or gas mixture during combustion without limit.

Figure 1:
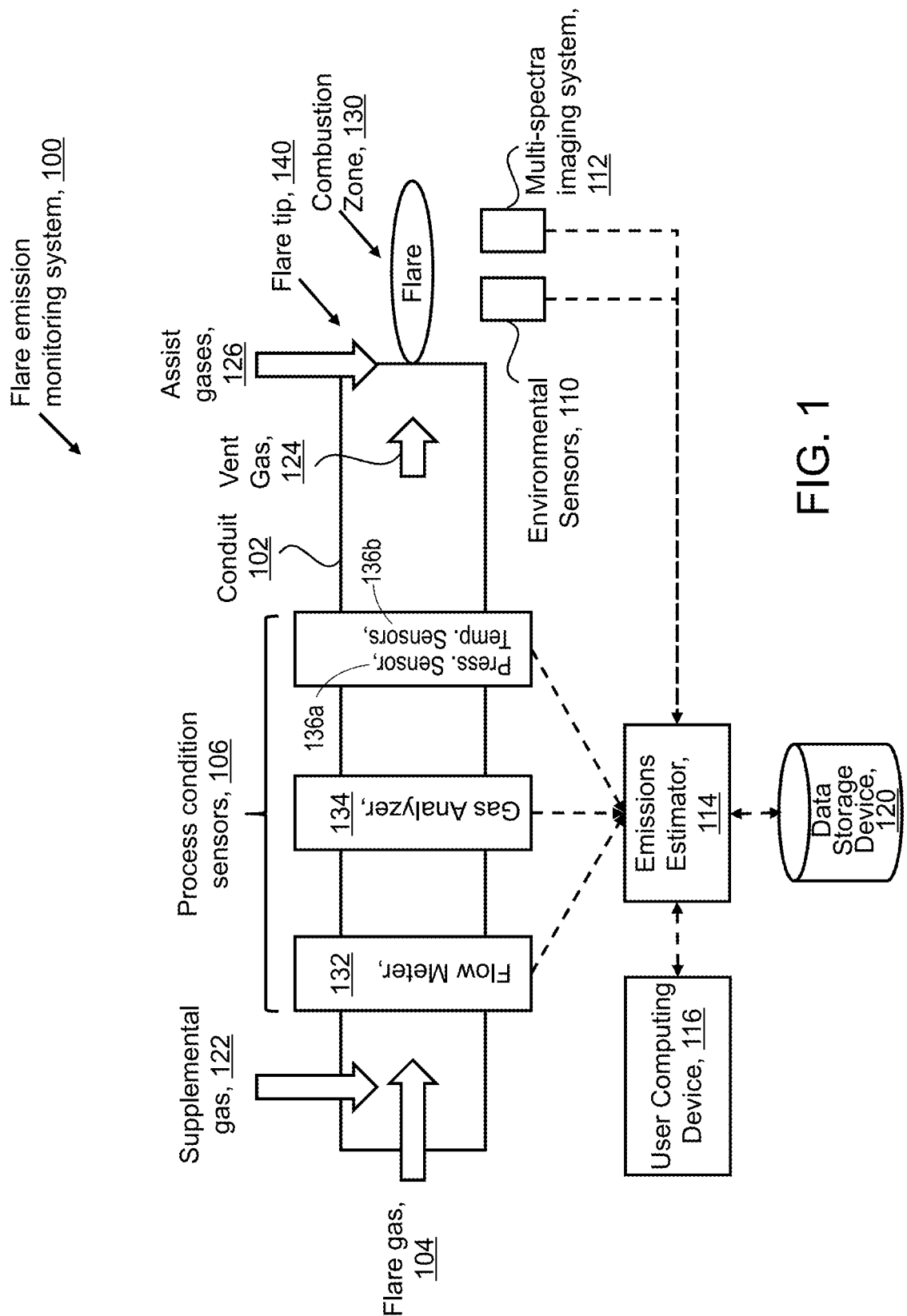
FIG. 1 is a schematic diagram illustrating one exemplary embodiment of a system for monitoring emissions including an emissions estimator.

FIG. 1 illustrates one exemplary embodiment of a flare emission monitoring system 100 for monitoring emissions of a flaring process. As shown, the flare emission monitoring system 100 can be in fluid communication with a conduit 102 (e.g., a flare stack) that receives a flow of a flare gas 104 emitted by an industrial process, and the flare emission monitoring system 100 includes a plurality of process condition sensors 106, one or more environmental sensors 110, a multi-spectral imaging system 112, an emissions estimator 114, a user computing device 116, and a data storage device 120 (e.g., a memory).

It can be appreciated that a flaring process can combust the flare gas 104 alone or a mixture of gases including the flare gas 104. Notably, under some circumstances, one or more gases can be mixed with the flare gas 104 to modify the energy content of the resultant gas mixture to facilitate combustion. In one example, a supplemental gas 122 (e.g., a fuel gas) can be added to the flare gas 104 within the conduit 102 to increase energy content of the resultant gas mixture, referred to herein as a vent gas 124. In another example, at least one assist gas(es) 126 (e.g., air and/or steam) can be added to the flare gas 104 or to the vent gas 124 (e.g., at a terminal end of the conduit 102, prior to a combustion zone 130) to improve combustion by decreasing energy content of the resultant gas mixture.

The plurality of process condition sensors 106 can be configured to measure respective process conditions of the gas(es) employed in the flaring process. Accordingly, the process condition sensors 106 can be independently positioned on, adjacent to, or within the conduit 102. The process condition sensors 106 can include, but are not limited to, one or more flow meters 132, gas analyzers 134, and one or more pressure sensors 136a and/or temperature sensors 136b. The flow meter(s) 132 can be configured to measure a speed of sound in the flare gas 104 and flow rates of the flare gas 104, the supplemental gas 122, the vent gas 124, and/or the assist gas(es) 126 prior to combustion. As an example, the flow meter 132 can be an ultrasonic flow meter. The gas analyzer (s) 134 can be configured to measure a ratio of carbon to hydrogen in the flare gas 104 or the gas mixture (e.g., the flare gas 104 with the supplemental gas 122 and/or assist gas(es) 126) prior to combustion. The pressure sensor(s) 136a can be configured to measure the pressure of the flare gas 104 prior to combustion. The temperature sensor(s) 136b can be configured to measure the temperature of the flare gas 104 prior to combustion.

The one or more environmental sensors 110 can be configured to measure one or more environmental conditions outside of the conduit 102 and adjacent to a flare tip 140. The flare tip 140 can be a terminal end of the conduit 102 prior to the combustion zone 130 where the flare gas 104 is combusted. The flare gas 104 or gas mixture including the flare gas 104 that enters the combustion zone 130 is referred to herein as a combustion gas. As an example, the one or more environmental sensors 110 can include a weather station configured to measure a speed of a crosswind adjacent to the flare tip 140.

The gas analyzer 134 can be configured to measure a ratio of carbon to hydrogen of the vent gas 124 (or the flare gas 104 if the supplemental gas 122 is not added) prior to combustion. As an example, the gas analyzer 134 can be a gas chromatograph or a mass spectrometer.

With further reference to FIG. 1, each of the process condition sensors 106 and the environmental sensors 110 is in communication with the emissions estimator 114. The emissions estimator 114 can be any computing device capable of performing the functions of flare emission monitoring discussed herein, including determination of combustion efficiency and total emissions of the flaring process. The user computing device 116 and the data storage device 120 are further provided in communication with the emissions estimator 114. The user computing device 116 can include a display configured to receive and display estimates of combustion efficiency and/or total emissions output by the emissions estimator 114. The data storage device 120 can be employed for storage and/or retrieval of process and/or environmental data as well as storage of combustion efficiency estimates and/or total emissions output by the emissions estimator 114.

In use, the process condition sensors 106 can acquire measurements of at least a portion of respective process conditions of the gases involved in the flaring process prior to combustion, while the environmental sensor(s) 110 can acquire measurements of respective environmental conditions adjacent to the flare tip 140. In other embodiments, one or more of the process conditions can be constant values stored by a data storage device or input by an operator. As discussed in greater detail below, the process conditions and environmental conditions can be received by the emissions estimator 114 and used to determine respective estimates of combustion efficiency of the flaring process according to different models, such as empirical models and non-parametric machine learning models.

In general, combustion efficiency (CE) can be calculated from predetermined factors including the process conditions and environmental conditions using an empirical parametric model derived from historical experimental tests. Such models are relatively easy to train with limited amount of experimental data and fast to implement. However, their prediction accuracy and applicability can be limited to relatively stable operating conditions where the process parameters and/or environmental parameters are not fluctuating rapidly, such as during non-flaring nominal flow conditions.

Alternatively, combustion efficiency can also be derived from a computationally intensive, non-parametric machine learning (e.g., an artificial intelligence (AI)) model that has also been trained with relevant historical experimental data. The non-parametric model can employ all available process parameter and environmental condition data, while making no assumptions on the functional form of the relationship between input and output variables. While the non-parametric model can require more data to be trained and more computational resources to be implemented as compared to the empirical model, it can provide higher predictive accuracy.

Accordingly, the emissions estimator 114 can be further configured to select between the empirical and non-parametric machine learning models and output combustion efficiency estimates according to the selected model. In an embodiment, the emissions estimator 114 can output a combustion efficiency estimate according to the empirical model when a change in the net heating value of the flare gas 104 within the combustion zone 130 ($NHV_{CZ}$) over a defined time interval is less than a predetermined maximum amount (e.g., either on the basis of an absolute change (magnitude) or a percentage change). Alternatively, the emissions estimator 114 can output a combustion efficiency estimate according to the machine learning model when the change in net heating value of the combustion gas within the combustion zone ($NHV_{CZ}$) over a defined time interval is greater than the predetermined maximum amount. Selecting the model in this manner reflects the understanding that the net heating value of the combustion gas within the combustion zone ($NHV_{CZ}$) can vary with the process conditions and/or environmental conditions and that the accuracy of combustion efficiency estimates provided by the empirical model can be reduced when the process conditions and/or environmental conditions, and consequent calculations of the net heating value of the combustion gas within the combustion zone ($NHV_{CZ}$) vary too much. Thus, this approach allows the flare emission monitoring system 100 to output a combustion efficiency estimate according to the model expected to provide the highest accuracy in view of the current process conditions and environmental conditions.

In alternative embodiments, the flare emissions monitoring system 100 can optionally include a multi-spectral imaging system 112 in communication with the emissions estimator 114. The multi-spectral imaging system 112 can be configured to measure absorption/emission spectra of flare gas molecules and combustion byproducts in the combustion zone 130 and determine a further estimate of combustion efficiency from the measured spectra. Such combustion efficiency estimates are independent of the process conditions and environmental conditions. As such, the emissions estimator 114 can receive estimates of combustion efficiency from the multi-spectral imaging system 112 for use in adjusting the selected model to output approximately the same combustion efficiency as this independent estimate. This approach can improve the accuracy of modeling and attendant combustion efficiency estimates.

Figure 2:
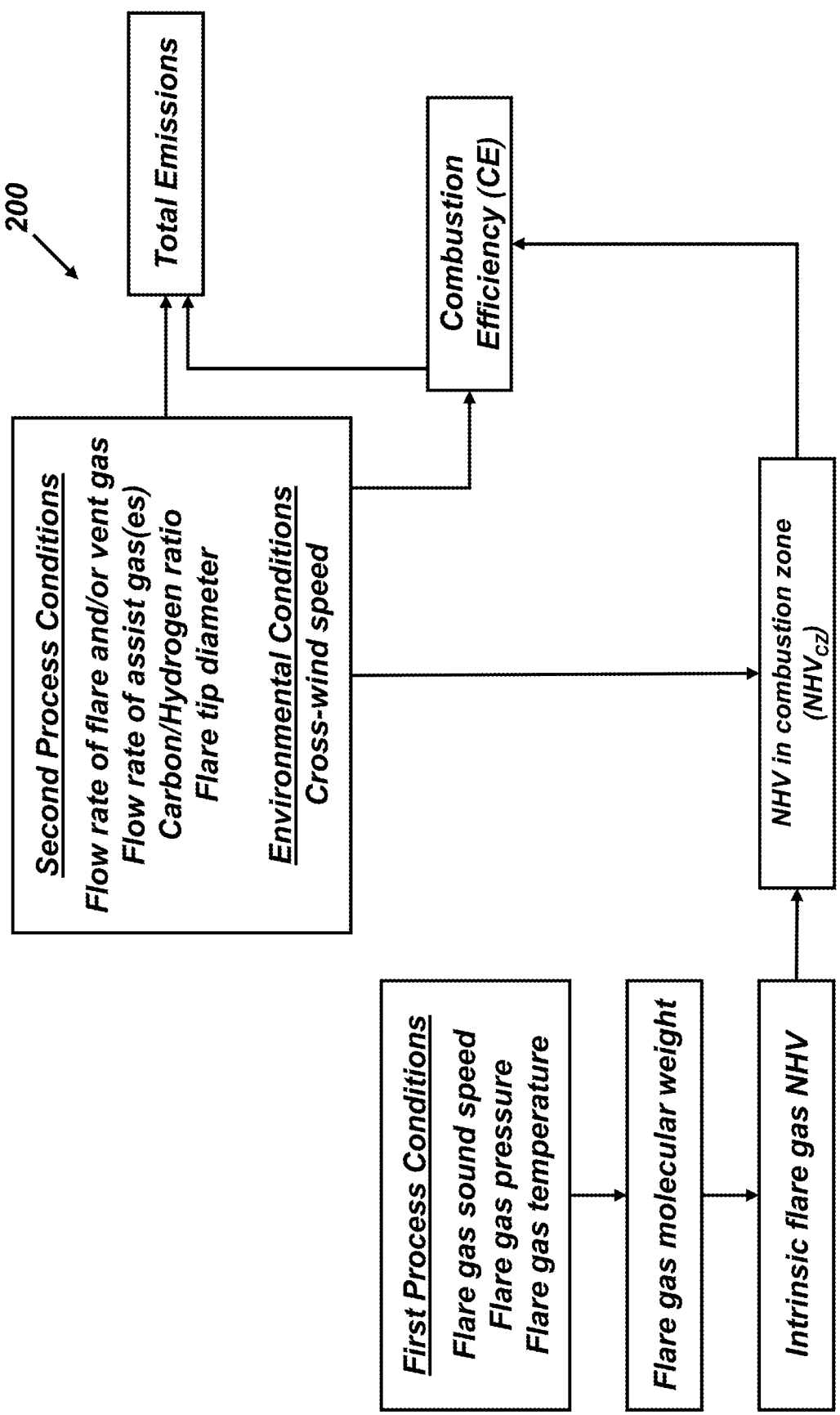
FIG. 2 is a block diagram illustrating calculations performed by the emissions estimator using process conditions and environmental conditions to estimate combustion efficiency and total emissions of a flaring process.

FIG. 2 is a block diagram 200 illustrating embodiments of various inputs received by the emissions estimator 114 and calculations performed by the emissions estimator 114 to determine estimates of combustion efficiency and total emissions. As discussed in greater detail below, the emissions estimator 114 can be configured to determine a first net heating value (NHV) for the flare gas 104 based upon a first set of process conditions. This first net heating value (NHV) is an intrinsic net heating value that is a property of the flare gas 104. Using this first net heating value (NHV), as well as a second set of process conditions, a second net heating value of the combustion gas within the combustion zone ($NHV_{CZ}$) can be determined. This second net heating value ($NHV_{CZ}$) represents the net heating value of the combustion gas, which can be the flare gas 104 alone, the flare gas 104 mixed with the supplemental gas 122 (e.g., the vent gas 124), the flare gas 104 mixed with the assist gas(es) 126, or the flare gas 104 mixed with the supplemental gas 122 and the assist gas(es) 126. Thus, the second net heating value of the combustion gas in the combustion zone ($NHV_{CZ}$) is different from the first net heating value (NHV) of the flare gas 104. The emissions estimator 114 can employ at least a portion of the second set of process conditions, the environmental conditions, and the second net heating value in the combustion zone ($NHV_{CZ}$) to determine combustion efficiency according to the empirical model and/or the non-parametric machine learning model. The total emissions of the combustion gas can be further determined by the emissions estimator 114 from the calculated combustion efficiency.

Determination of the first net heating value (NHV) of the flare gas 104 is discussed below with further reference to FIG. 2. As shown, the emissions estimator 114 receives the first process conditions, including the speed of sound in the flare gas 104 within the conduit 102, the pressure of the flare gas 104 within the conduit 102, and the temperature of the flare gas 104 within the conduit 102. As discussed above, the speed of sound in the flare gas 104 can be received from the flow meter 132, the pressure of the flare gas 104 can be received from the pressure sensor 136a, and the temperature of the flare gas 104 can be received from the temperature sensor 136b.

In an embodiment, the flow meter 132 is an ultrasonic flow meter. Ultrasonic measurements can be employed to determine the speed of sound in the flare gas 104. The speed of sound in the flare gas 104, as well as the pressure and temperature of the flare gas 104, can be further employed to determine the molecular weight of the flare gas 104. A detailed discussion of determining the speed of sound in the flare gas and the molecular weight of the flare gas 104 can be found in U.S. Pat. No. 6,216,091, the entirety of which is incorporated by reference.

For hydrocarbons, including hydrogen ($H_2$), the net heating value (NHV) is strongly correlated to its molecular weight (MW). Using the speed of sound in the flare gas 104 and the corresponding MW of various hydrocarbon compounds in the flare gas 104, a linear fit or second order polynomial fit can be used to generate a satisfactory estimate of the first net heating value (NHV).

In alternative embodiments, the emissions estimator does not determine the first net heating value (NHV) based upon the first process conditions. Instead, the emissions estimator can determine the first net heating value (NHV) by retrieval from the data storage device or input from the user computing device.

In either case, the emissions estimator 114 can employ the first net heating value (NHV) to determine the combustion efficiency of the combustion gas. As further illustrated in FIG. 2, the emissions estimator 114 receives a second set of process conditions and one or more environmental conditions for determination of the second net heating value (NHV$_{CZ}$) of the combustion gas within the combustion zone 130. Examples of the second set of process conditions can include one or more of a flow rate of the flare gas 104, a flow rate of the vent gas (when the at least one supplemental gas(es) 122 are present), a flow rate of the at least one assist gas(es) 126 when present, a carbon/hydrogen ratio, or flare tip diameter. The flare tip diameter can be the inner diameter of the conduit 102 at about the flare tip 140 (e.g., the inner diameter of a terminal end of the conduit 102 adjacent the combustion zone 130.)

In an embodiment, when the combustion gas includes the flare gas 104, the at least one supplemental gas(es) 122, and the at least one assist gas(es) 126 (e.g., steam and/or air), the second net heating value of the combustion gas within the combustion zone (NHV$_{CZ}$) can be determined according to Equation 1:

$$NHV_{CZ} = \frac{Q_{vg} * NHV_{vg}}{Q_{vg} + Q_s + Q_a} \quad (1)$$

where NHV$_{cz}$ is in BTU/SCF, NHV$_{vg}$ is the net heating value of the vent gas (e.g., the flare gas 104 and the at least one supplemental gas(es) 122) in BTU/SCF, Q$_s$ is the volumetric flow rate of steam in SCFH, Q$_a$ is the volumetric flow rate of premix air in SCFH, and Q$_{vg}$ is the volumetric flow rate of vent gas 124 in SCFH. It can be appreciated from Equation 1 that, when steam or air is omitted from the assist gas(es) 126, the corresponding flow rate term, Q$_s$ or Q$_a$, respectively, is zero. Furthermore, when the assist gas(es) 126 is omitted from the combustion gas, the second net heating value of the combustion gas within the combustion zone (NHV$_{CZ}$) is equal to the net heating value of the vent gas (NHV$_{vg}$).

As discussed above, the volumetric flow rate of the flare gas 104 and/or vent gas 124 can be received from the flow meter 132, the volumetric flow rate of the supplemental gas 122 can be received from a fuel flow meter (if it is not measured by the flow meter 132), and the volumetric flow rate of the assist gas 126 can be received from a steam/air flow meter or the fan curve of an air blower.

The emissions estimator 114 can be further configured to determine the combustion efficiency of the combustion gas based on the empirical model or the non-parametric machine learning model using at least a portion of the second process conditions and the one or more environmental conditions in combination with the second net heating value of the combustion gas within the combustion zone (NHV$_{cz}$). The environmental condition(s) can include a crosswind speed at or adjacent to a terminal end of the conduit 102 (e.g., the flare tip 140). Examples of empirical models can be configured to calculate the combustion efficiency (CE) as a function of NHV$_{cz}$, the vent gas exit velocity, the crosswind speed, and carbon to hydrogen ratio. Examples of non-parametric machine learning models can be configured to apply deep machine learning technology, such as a random forest algorithm, to calculate combustion efficiency (CE) using process conditions as well as environmental conditions.

The emissions estimator 114 can select which of the empirical model or the non-parametric machine learning model is employed to determine the combustion efficiency. In general, both models have certain strengths and limitations. Depending on the flare system configuration and process conditions, one can be chosen over the other. For example, under circumstances where process conditions such as the flare gas flow and/or flare gas composition do not change dramatically, the empirical model can provide more accurate results. Conversely, under circumstances, such as a flaring event, where the process conditions and/or environmental conditions change dramatically, the accuracy of the empirical model can be reduced. Because the second net heating value of the combustion gas in the combustion zone (NHV$_{CZ}$) is a function of the process conditions, it can be used to select between the two models. When the second net heating value (NHV$_{CZ}$) changes by less than a predetermined amount, on an absolute basis or percentage basis, during a defined time period, the empirical model can be selected. When the second net heating value (NHV$_{CZ}$) changes by greater than the predetermined amount, on an absolute basis or percentage basis, the non-parametric machine learning model can be selected.

Regardless of which model is selected, total emission (e.g., total un-combusted hydrocarbons, soot, methane (CH$_4$), carbon dioxide (CO$_2$), carbon dioxide equivalent (CO$_2$e), etc.) can be further determined from the volumetric flow rate of the vent gas and the estimated combustion efficiency. The exact manner in which total emission is calculated can be defined by regulations applicable to the facility at which the flaring process is performed.

Figure 3:
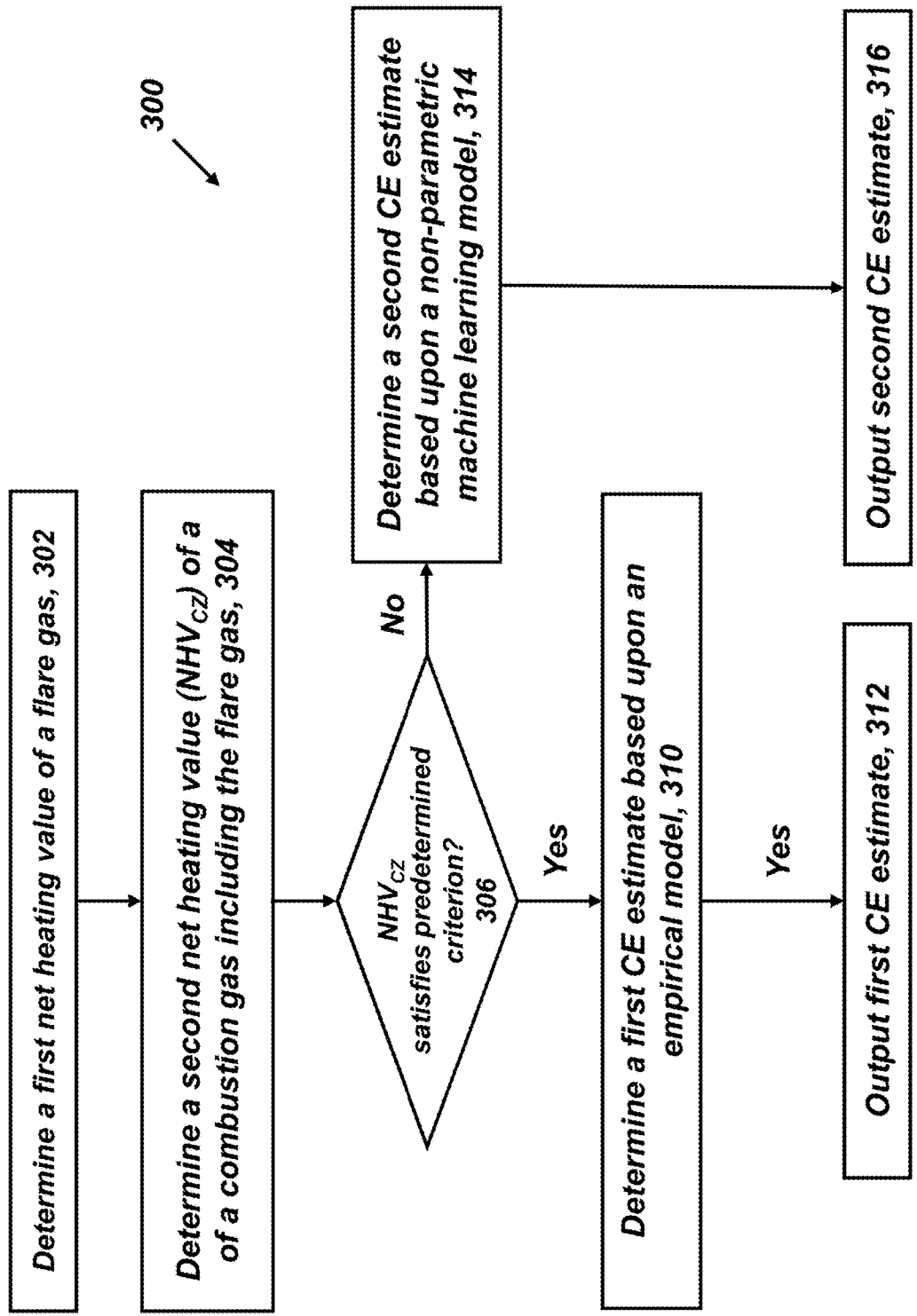
FIG. 3 is a flow diagram illustrating one exemplary embodiment of a method for monitoring emissions of a flaring process.

FIG. 3 is a flow diagram illustrating one exemplary embodiment of a method 300 for monitoring emissions of a flaring process, including determination of combustion efficiency and total emission. The method 300 is discussed below in the context of the above-discussed embodiments of FIGS. 1-2 and includes operations 302-316. It can be understood that, in alterative embodiments, the method can include greater or fewer operations than illustrated in FIG. 3 and the operations of the method can be performed in an order different than that illustrated in FIG. 3.

In operation 302, the first net heating value (NHV) of the flare gas 104 (e.g., the intrinsic flare gas NHV) can be determined by one or more processors (e.g., the emissions estimator 114). As discussed above, the emissions estimator 114 can determine the first net heating value (NHV) from the first process conditions, by input from the user computing device 116, or retrieval from the data storage device 120.

In operation 304, the second net heating value of the combustion gas within the combustion zone 130 (NHV$_{CZ}$) can be determined by the one or more processors (e.g., the emissions estimator 114). The combustion gas can include the flare gas 104 alone or in combination with one or more of the supplemental fuel gas(es) 122 or the assist gas(es) 126 (e.g., steam and/or air). The combustion zone 130 can be adjacent to a terminal end of the conduit 102 in which the combustion gas mixture flows. The second net heating value (NHV$_{CZ}$) can be determined based upon the first net heating value (NHV), and volumetric flow rates of the constituent gas(es) of the combustion gas (e.g., the volumetric flow rate of the assist gas(es) 122, a volumetric flow rate of a mixture of the flare gas 104 and assist gas(es) 126 prior to combustion, and a volumetric flow rate of the supplemental gas(es) 122, etc.)

In decision block 306, the one or more processors (e.g., the emissions estimator 114) can compare the second net heating value (NHV$_{CZ}$) to a predetermined criterion. As an example, the predetermined criterion can be a maximum change in the second net heating value ($NHV_{CZ}$) during a defined time period. This maximum change can be defined on an absolute (e.g., magnitude) basis or a percentage basis.

Under circumstances where the second net heating value ($NHV_{CZ}$) satisfies the predetermined criterion, the method 300 selects the empirical model and moves to operation 310, where the first combustion efficiency (CE) estimate is determined by the one or more processors (e.g., the emissions estimator 114). The determined first combustion efficiency (CE) can be further output by the emissions estimator 114 in operation 312.

Selection of the empirical model and output of the first combustion efficiency (CE) estimate reflects the understanding that, when the second net heating value ($NHV_{CZ}$) satisfies the predetermined criterion, the accuracy of the empirical model is relatively high.

Under circumstances where the second net heating value ($NHV_{CZ}$) does not satisfy the predetermined criterion, the method 300 selects the non-parametric machine model and moves to operation 314. In operation 314, the one or more processors (e.g., the emissions estimator 114) can determine the second estimate of combustion efficiency (CE) of the combustion gas. The machine learning model can also employ as inputs the second net heating value ($NHV_{CZ}$), an exit velocity of the vent gas 124 at a terminal end of the conduit 102, and the second process conditions and environmental conditions (e.g., crosswind speed at the terminal end of the conduit 102, flow rate of the assist gas(es) 126 and/or supplemental gas(es) 122 within the conduit 102, the ratio of carbon to hydrogen (for the flare gas, vent gas, or other gas combinations), the diameter of the flare tip 140. The determined second combustion efficiency (CE) can be further output by the emissions analyzer in operation 316.

Selection of the machine learning model and output of the second combustion efficiency (CE) estimate reflects the understanding that, when the second net heating value ($NHV_{CZ}$) does not satisfy the predetermined criterion, the predictive accuracy of the empirical model is relatively low compared to that of the machine learning model. Accordingly, under these circumstances, use of the machine learning model to determine and output the second combustion efficiency (CE) estimate is justified despite its consumption of greater computational resources.

Figure 4:
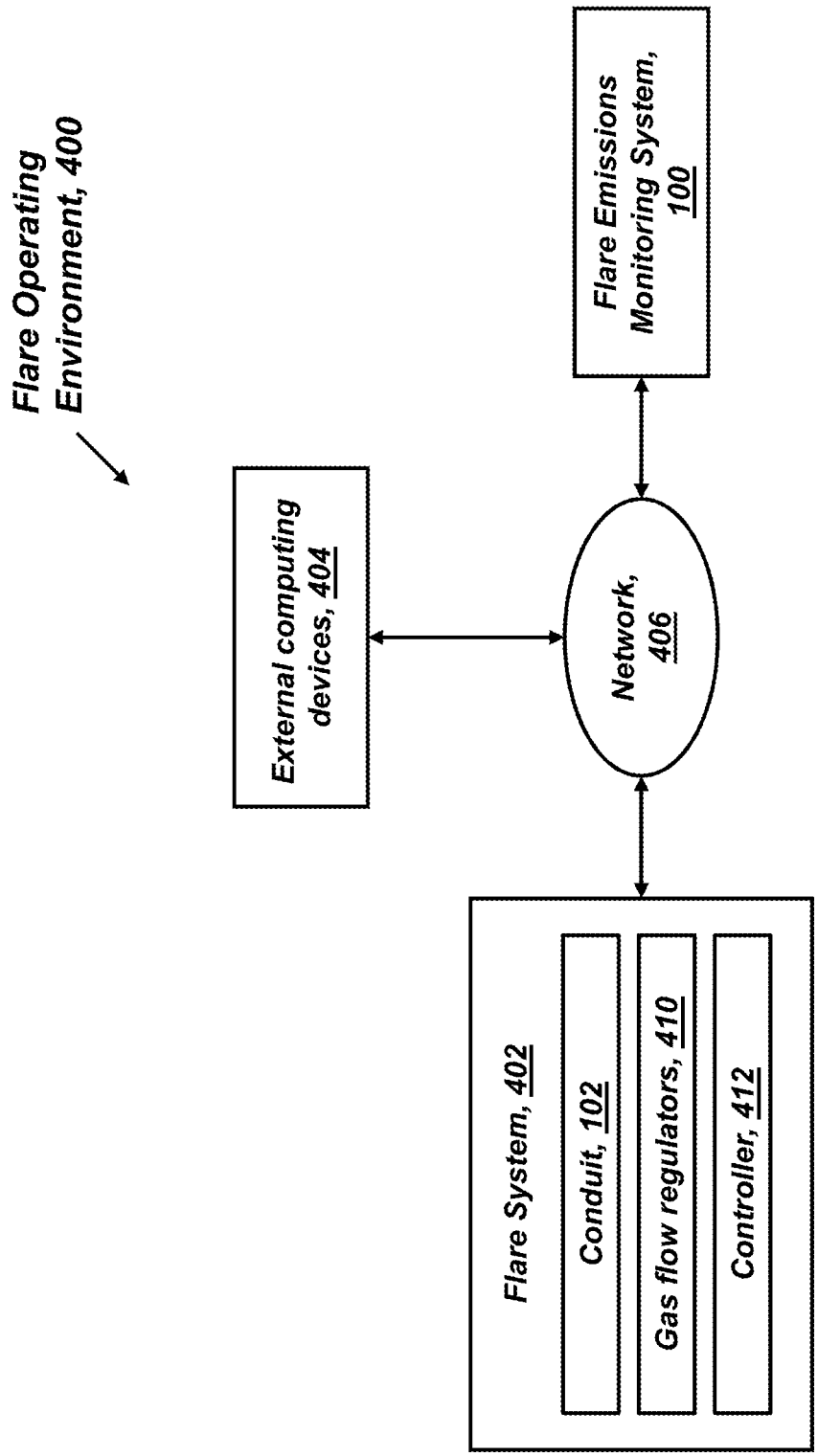
FIG. 4 is a block diagram illustrating an operating environment including the system of FIG. 1 in communication with a flare control system.

Embodiments of the flare emission monitoring system 100 can be further employed to improve flaring operations. FIG. 4 is a schematic block diagram illustrating one exemplary embodiment of a flare operating environment 400 including the flare emission monitoring system 100, a flare system 402, and one or more external computing devices 404 in communication via a network 406. As shown, the flare system 402 can include the conduit 102, respective gas flow regulators 410 for the flare gas 104, the supplemental gas(es) 122, the assist gas(es) 126, and a controller 412.

The controller 412 can be a computing device including one or more processors capable of performing the functions of flare emission monitoring and control discussed herein. The user computing device 116 and the data storage device 120 can be in communication with the controller 412, directly or via the network 406. The user computing device 116 and the data storage device 120 can be in communication with the emissions estimator 114, either directly or via the network 406.

The data storage device 120 can be employed for storage and/or retrieval of process and/or environmental data as well as storage of combustion efficiency estimates and/or total emissions output by the emissions estimator 114. Alternatively or additionally, the process condition sensors 106 and the environmental sensors 110 can be in communication with the controller 412. While FIGS. 1 and 4 illustrate the controller 412 and the emissions estimator 114 as separate components, in alternative embodiments, they can be combined in one or more computing devices without limit.

The gas flow regulators 410 (e.g., valves) can also be in communication with the controller 412. Respective gas flow regulators 410 can be provided for each of the flare gas 104, the supplemental fuel gas(es) 122, and the assist gas(es) 126. The controller 412 can be further configured to generate and transmit one or more control signals independently to respective ones of the gas flow regulators 410. A control signal, when received by one of the gas flow regulators 410, can be operative to cause that gas flow regulator 410 to open or close in order to adjust the flow rates of gas (e.g., the flare gas 104, the supplemental gas(es) 122, or the assist gas(es) 126) flowing therethrough.

Figure 5:
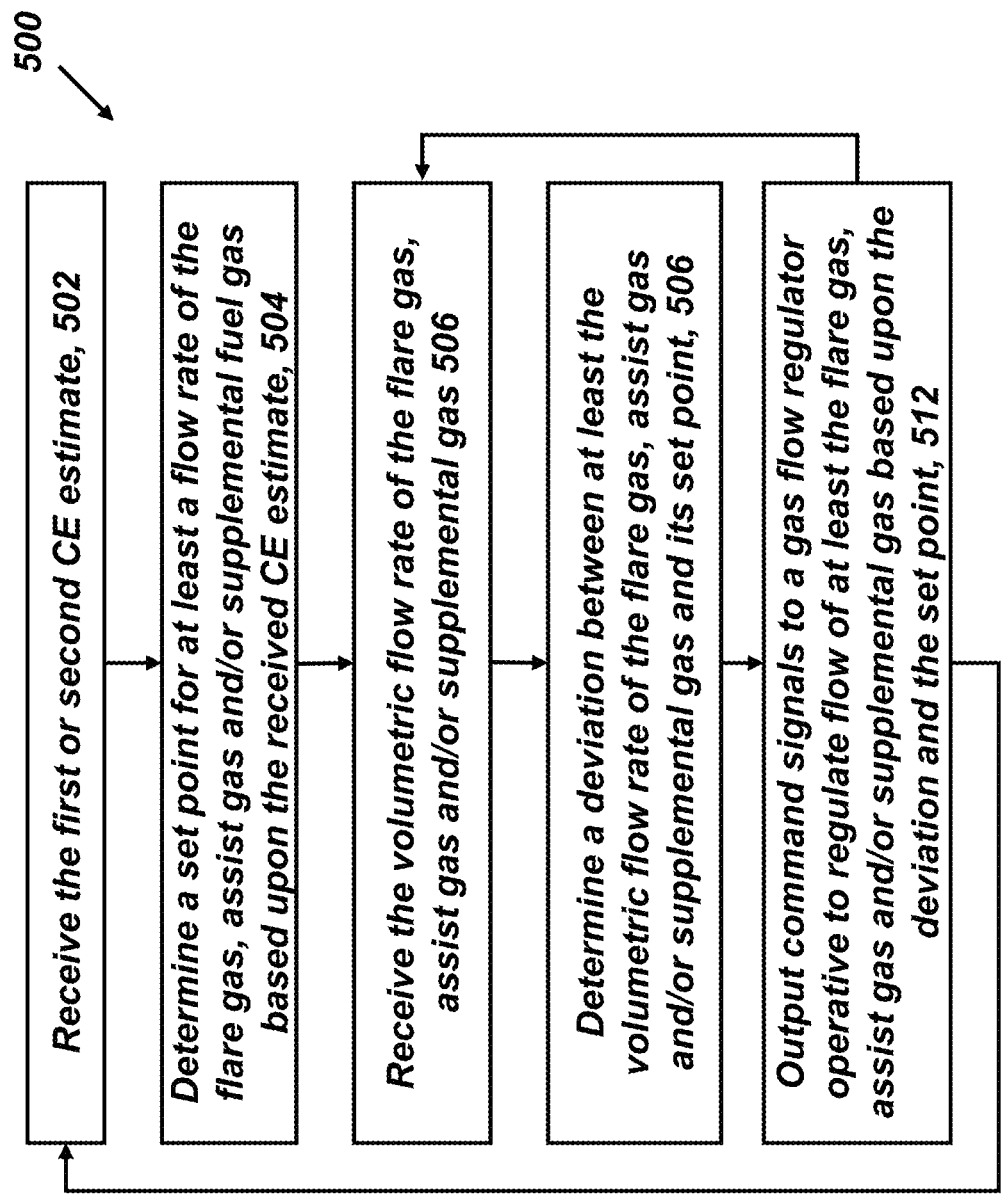
FIG. 5 is a flow diagram illustrating one exemplary embodiment of a method for flare control based upon estimated combustion efficiency.

FIG. 5 illustrates a method 500 for flare control performed by the flare system 402. The method 500 is discussed below in the context of the above-discussed embodiments of FIGS. 1-2 and includes operations 502-512. It can be understood that, in alternative embodiments, the method can include greater or fewer operations than illustrated in FIG. 5 and the operations of the method can be performed in an order different than that illustrated in FIG. 5.

In operation 502, the controller 412 can receive a CE estimate (e.g., the first CE estimate 312 or the second CE estimate 316). In one example, the controller 412 can receive the first CE estimate 312 or the second CE estimate 316 from the flare emissions monitoring system 100 via the network 406.

In operation 504, the controller 412 can determine a set point for flow of the flare gas 104 based upon the received CE estimate (e.g., the first CE estimate 312 or the second CE estimate 316). When the combustion gas includes the at least one supplementary gas(es) 122 (e.g., supplementary fuel gas(es)), the controller 412 can determine a set point for flow of the at least one supplementary gas(es) 122 and/or the vent gas 124 based upon the received CE estimate. When the combustion gas includes the at least one assist gas(es) 126 (e.g., air and/or steam), the controller 412 can determine a set point for flow of the at least one assist gas(es) 122 based upon the received CE estimate.

The controller 412 can be configured to determine the gas flow set points in a variety of ways. In one example, the controller 412 can employ a lookup table that correlates CE to respective flow rate set points (e.g., for the flare gas 104, and optionally for the at least one supplementary gas(es) 122, the at least one assist gas(es) 126 when present, or the vent gas 124). In another example, the controller 412 can employ predetermined algorithms that provide respective gas flow set points using CE as an input.

In operation 506, the controller 412 can receive the volumetric flow rate of the flare gas 104. When the combustion gas includes the at least one supplementary gas(es) 122 (e.g., supplementary fuel gas(es)), the controller 412 can receive the volumetric flow rate of the at least one supplementary gas(es) 122 and/or vent gas 124. When the combustion gas includes the at least one assist gas(es) 126 (e.g., air and/or steam), the controller 412 can receive the volumetric flow rate of the at least one assist gas(es) 126. In certain embodiments, at least a portion of the respective volumetric flow rates can be received directly from measurement devices (e.g., respective flow meters 132). In other embodiments, at least a portion of the respective volumetric flow rates can be received from a data storage device.

In operation 510, the controller 412 can determine a deviation between the volumetric flow rate of at least the flare gas 104 and the set point for the volumetric flow rate of the flare gas 104. When the combustion gas includes the at least one supplementary gas(es) 122 (e.g., supplementary fuel gas(es)), the controller 412 can determine the deviation between the volumetric flow rate of the at least one supplementary gas(es) 122 and/or vent gas 124 and the set point for the volumetric flow rate of at least one supplementary gas(es) 122 and/or vent gas 124. When the combustion gas includes the at least one assist gas(es) 126 (e.g., air and/or steam), the controller 412 can determine the deviation between the volumetric flow rate of the at least one assist gas(es) 126 and the set point for the volumetric flow rate of the at least one assist gas(es) 126.

In operation 512, the controller 412 can output one or more command signals to respective gas flow regulators based upon the set points and determined deviations in order to maintain/achieve the respective set points. In general, when the deviation for a respective volumetric gas flow rate is determined to be greater than a predetermined tolerance for that volumetric gas flow rate, the command signals can be operative to cause the corresponding gas flow regulator to actuate (e.g., open or close) in such a manner that reduces the determined deviation. In certain embodiments, such actuation can reduce the determined deviation to be less than the predetermined tolerance. Alternatively, when the deviation for a respective volumetric gas flow rate is determined to be less than its predetermined tolerance, the command signals can be operative to cause the corresponding gas flow regulators to maintain their state. Under circumstances where the deviation for a respective volumetric gas flow rate is determined to be less than its predetermined tolerance and the gas flow regulator does not require instructions to maintain its state, no command signals may be necessary.

The predetermined deviation can be received by the controller 412 in a variety of ways. In one example, the predetermined deviation can be retrieved from a data storage device (e.g., via the network 406). In another example, the predetermined deviations can be input by an operator. In either case, the predetermined deviation for respective volumetric flow rates can be independent of one another and can be the same or different.

Accordingly, the controller 412 can output one or more command signals to at least a flare gas flow regulator based upon the set point and determined deviation for the volumetric flow rate of at least the flare gas 104. When the combustion gas includes the at least one supplementary gas(es) 122 (e.g., supplementary fuel gas(es)), the controller 412 can output one or more command signals to at least one supplementary gas flow regulators based upon the set point and determined deviation for the volumetric flow rate of the at least one supplementary gas(es) 122 and/or the vent gas 124. When the combustion gas includes the at least one assist gas(es) (e.g., air and/or steam), the controller 412 can output one or more command signals to one or more assist gas flow regulators based upon the set point and determined deviation for the volumetric flow rate of the at least one assist gas(es) 126.

Following operation 512, under circumstances where the CE estimate does not change, the method 500 can return to operation 502. Alternatively, under circumstances where the CE estimate changes, the method 500 can return to operation 502 following operation 512. Beneficially, in this manner, closed-loop control of the gas flow rate for the flare gas 104, and optionally the at least one supplementary gas(es) 122, the vent gas 124, and/or the at least one assist gas(es) 126 when present, based upon CE estimates can be achieved.

In some embodiments, control of the flow rate of the flare gas can be omitted. As an example, under emergency circumstances where flaring is performed to relieve overpressure, the flow rate of the flare gas can be uncontrolled (e.g., as high as possible). Accordingly, under these circumstances, the flow rates of the at least one supplementary gas(es) and/or the flow rates of the at least one assist gas(es), when present, can be controlled as discussed above without control of the flow rate of the flare gas.

As discussed above, the flare emissions monitoring system 100 can be in communication with one or more external computing devices 404 via the network 406. The flare emissions monitoring system 100 can be configured to transmit operational data to the external computing device(s) 404. Examples of the operational data can include, but is not limited to, one or more of NHV calculated by the emissions estimator 114 (e.g., the intrinsic flare gas NHV, NHV in the combustion zone 130 ($NHV_{CZ}$), etc.), process conditions measured by the process condition sensors 106, environmental conditions measured by the environmental sensors 110 (e.g., crosswind speed), gas composition, etc. The external computing devices 404 can employ the operational data as training data for machine learning models configured to estimate CE. Beneficially, such training data can improve the accuracy of the machine learning models.

In additional embodiments, computational fluid dynamics (CFD) modeling of the flare tip can be performed to independently estimate flare CE under operating conditions. The CFD modeling can be performed by the emissions estimator 114, the external computing devices 404, or combinations thereof. The emissions estimator 114 can employ the CFD estimates of combustion efficiency for use in adjusting the selected model to output approximately the same combustion efficiency as the CFD estimate. This approach can improve the accuracy and reliability of the CE model.

In further embodiments, the emissions estimator 114 can be configured to use the models of the second net heating value ($NHV_{CZ}$) and the combustion efficiency (CE) in combination with a model for smoke yield (SY) to determine set points for the flow rates of the supplemental fuel gas(es) 122 and/or the assist gas(es) 126 that achieve a target combustion efficiency (CE). These set points can be provided to the controller 412 for generation of command signals operative to maintain/achieve respective set points. Thus, the flare system 402 can achieve the target combustion efficiency (CE).

In general, smoke adopts its ordinary and customary meaning and can refer to airborne particulates and/or gases emitted during combustion of a material, alone or in combination with volume of air entrained or otherwise mixed with such particulates and/or gases. That is, smoke can be a product of incomplete combustion. In an embodiment, smoke yield (SY) can be a ratio (e.g., a mass ratio) of an amount of smoke produced during flaring to an amount of the combustion gas combusted (e.g., the flare gas 104, supplemental fuel gas(es) 122, and assist gas(es) 126).

It can be appreciated that the second net heating value ($NHV_{CZ}$), the combustion efficiency (CE), and the smoke yield (SY) are not wholly independent from one another but are instead interrelated. That is, the flow rate set points determined for the supplemental fuel gas(es) 122 and/or the assist gas(es) 126 that achieve a target combustion efficiency (CE) can influence the attendant second net heating value ($NHV_{CZ}$) and smoke yield (SY). Furthermore, there are operating costs associated with use of the supplemental fuel gas(es) 122 and assist gas(es) 126. Thus, the target combustion efficiency (CE) can be determined alone or in combination with predetermined constraints placed upon one or more of the second net heating value ($NHV_{CZ}$), the smoke yield (SY), the flow rate of the supplemental fuel gas(es) 122, or the flow rate of the assist gas(es) 126.

Figure 6:
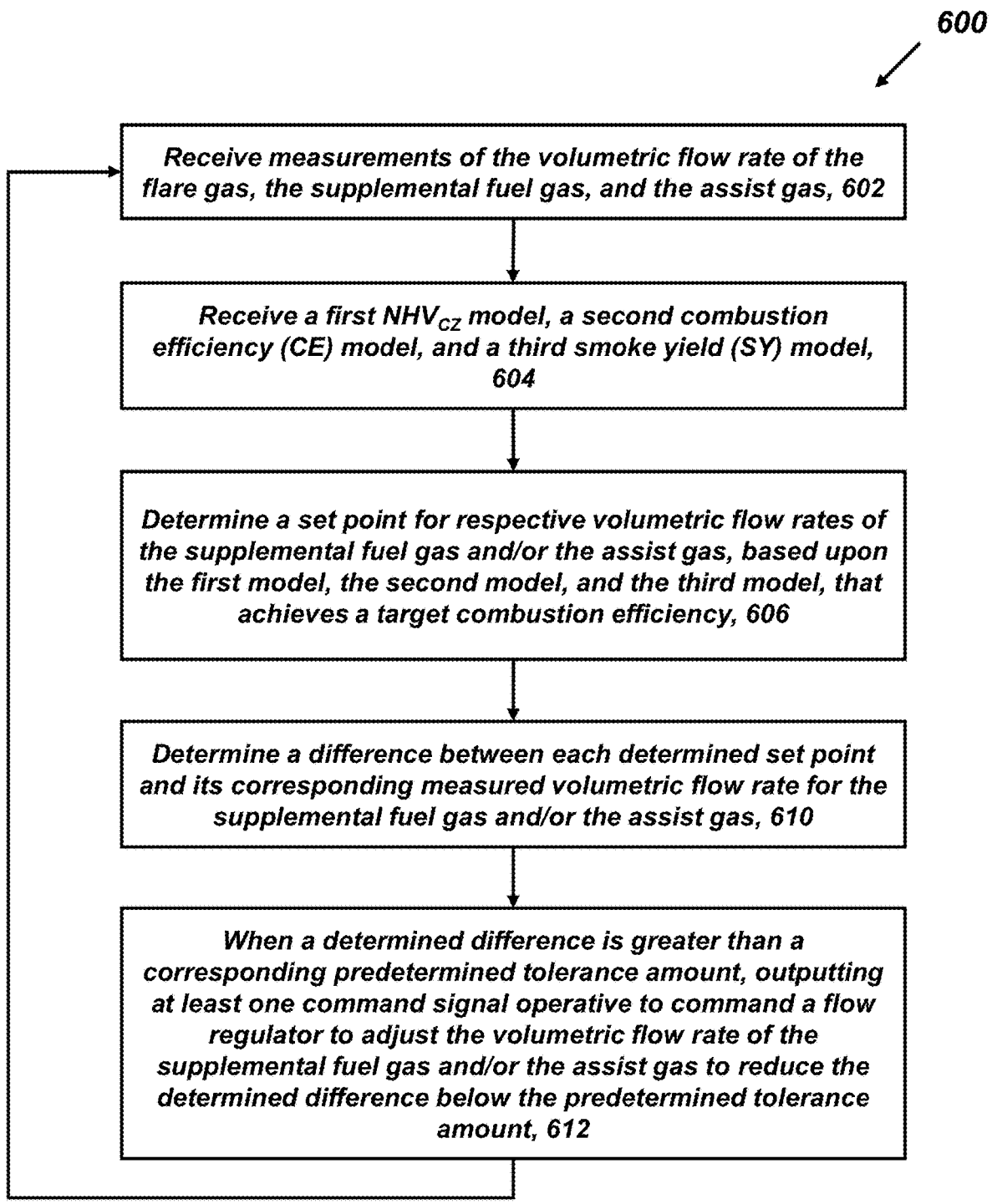
FIG. 6 is a flow diagram illustrating one exemplary embodiment of a method for controlling a flaring process to achieve a predetermined combustion efficiency.

FIG. 6 illustrates a method 600 for flare control performed by the flare system 402. The method 600 is discussed below in the context of the above-discussed embodiments of FIGS. 1-3 and includes operations 602-612. It can be understood that, in alterative embodiments, the method can include greater or fewer operations than illustrated in FIG. 6 and the operations of the method can be performed in an order different than that illustrated in FIG. 6.

In operation 602, the emissions estimator 114 can receive measurements of the volumetric flow rates of the flare gas 104, the supplemental fuel gas(es) 122, and the assist gas(es) 126. As an example, the emissions estimator 114 can receive these measurements directly from the process condition sensors 106, from the data storage device 120, or combinations thereof.

In operation 604, the emissions estimator 114 can receive a first model for the second net heating value ($NHV_{CZ}$), a second model for combustion efficiency (CE), and a third model for smoke yield (SY). The models may be maintained by the data storage device 120 and retrieved by the emissions estimator 114.

The first model for the second net heating value ($NHV_{CZ}$) and the second model for the combustion efficiency (CE) can be chosen as described above. The second model of the combustion efficiency (CE) can be the model selected from the empirical model or the non-parametric machine learning model as discussed with reference to FIG. 3.

Figure 7:
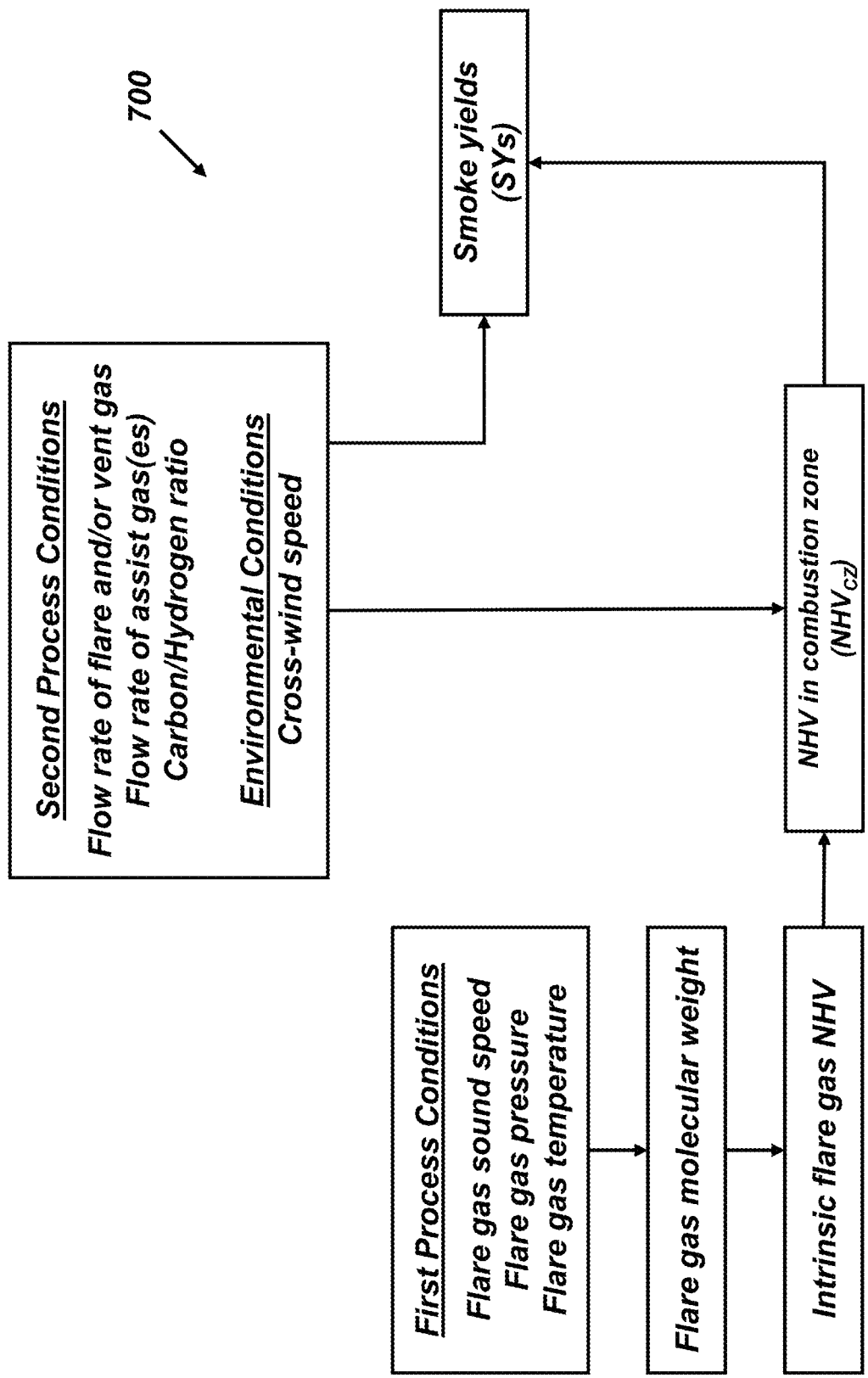
FIG. 7 is a flow diagram illustrating one exemplary embodiment of a method for estimating smoke yield in a flaring process.

Modeling of the smoke yield (SY) is discussed in detail in regards to FIG. 7. As shown, FIG. 7 presents a block diagram 700 illustrating embodiments of various inputs received by the emissions estimator 114 and calculations performed by the emissions estimator 114 to determine estimates of smoke yield (SY). As discussed above, the emissions estimator 114 can be configured to determine the first net heating value (NHV) for the flare gas 104 based upon the first set of process conditions. Using the first net heating value (NHV), as well as the second set of process conditions, the second net heating value of the combustion gas within the combustion zone ($NHV_{CZ}$) can be determined. The second net heating value ($NHV_{CZ}$) represents the net heating value of the combustion gas, which can be the flare gas 104 alone, the flare gas 104 mixed with the supplemental gas 122 (e.g., the vent gas 124), the flare gas 104 mixed with an assist gas 126, or the flare gas 104 mixed with the supplemental gas 122 and an assist gas 126.

In either case, the smoke yield (SY) can be estimated based upon the first and second set of process conditions according to Equations 2(a) and 2(b):

Assist gas is air:

$$\text{Smoke Yield (SY)} = f(D, NHV, NHV_{DIL}, A, U, V, MW, CHR, Pi_{vg}, P_{cz}) \quad (2a)$$

Assist gas is steam:

$$\text{Smoke Yield (SY)} = f(D, NHV, NHV_{CZ}, S, UN, MW, CHR, SER, Pi_{vg}, Pi_{cz}) \quad (2b)$$

where D is the flare tip diameter (ft), NHV is the first (intrinsic) net heating value of the vent gas 124 (BTU/SCF), A is the volumetric flow rate of air assist gas (lbs/MMBTU), S is the volumetric flow rate of steam assist gas (lbs/MMBTU), U is the cross-wind speed (ft/s), V is the exit velocity of the combustion gas from the conduit 102 (ft/s), MW is the molecular weight of the vent gas 124 (lb/lbmol), CHR is the carbon to hydrogen ratio, SER is the ratio of actual assist steam to stoichiometric steam, $Pi_{vg}$ is the number of pi ($\pi$)-bonds in the vent gas 124, $Pi_{cz}$ is the number of $\pi$-bonds in the combustion gas. By convention, $NHV_{CZ}$ is referred to as $NHV_{DIL}$ in the when air as the assist gas. Thus, $NHV_{DIL}$ can be determined in the same manner as $NHV_{CZ}$.

It will be appreciated that a single bond is a sigma bond ($\sigma$), and is the first covalent bond between any two atoms. Additional covalent bonds are pi bonds ($\pi$). Thus, a double bond has one sigma and one pi bond. A triple bond has one sigma and two pi bonds. $Pi_{vg}$ reflects different hydrocarbon species in the vent gas 124, in addition to CHR and MW. $Pi_{cz}$ reflects different hydrocarbon species of the combustion gas in the combustion zone.

The emissions estimator 114 can be further configured to determine the smoke yield (SY) of the combustion gas using Equation 2a or 2b (depending upon whether the assist gas 126 is air or steam) using an empirical model or a non-parametric machine learning model (e.g., a deep learning model). Under circumstances where historical data is limited, it can be difficult to train the non-parametric machine learning model. Accordingly, in this circumstance, the empirical model may be preferred. However, under circumstances where a significant amount of historical data is available, either the empirical or non-parametric machine learning model may be employed.

In operation 606, the emissions estimator 114 can determine a set point for respective volumetric flow rates for at least one of the supplemental gas 122 and the assist gas 126, based upon the received models for the second net heating value ($NHV_{CZ}/NHV_{DIL}$), the combustion efficiency (CE), and the smoke yield (SY), which achieve the target combustion efficiency (CE), alone or in combination with one or more predetermined constraints. The target combustion efficiency can be maintained by the data storage device 120 and retrieved by the emissions estimator 114.

As discussed above, the one or more predetermined constraints can be imposed with respect to the second net heating value ($NHV_{CZ}/NHV_{DIL}$), the smoke yield (SY), the volumetric flow rate of the supplemental fuel gas(es) 122, or the assist gas(es) 126, in any combination. The predetermined constraints can represent practical considerations with regards to flaring operations. In one aspect, predetermined constraints upon the second net heating value ($NHV_{CZ}/NHV_{DIL}$) and/or the smoke yield (SY) can be imposed to satisfy regulatory requirements. In another aspect, predetermined constraints upon the volumetric flow rates of the supplemental fuel gas(es) 122 and/or the assist gas 126 can be imposed because of operational costs incurred when using these gases.

A constraint can take a variety of forms. In one aspect, the constraint can be a single predetermined permissible value (e.g., values greater than or less than the single permissible value are prohibited). In another aspect, the constraint can be a range of predetermined permissible values (values greater than or less than the predetermined permissible values are prohibited). In a further aspect, the constraint can be a predetermined maximum permissible value (e.g., values less than or equal to the maximum permissible value are allowed, while values greater than the maximum value are prohibited). In an additional aspect, the constraint can be a predetermined minimum permissible value (e.g., values greater than or equal to the minimum permissible value are allowed while values less than the minimum value are prohibited).

In one example, a minimum permissible value constraint can be imposed upon the second net heating value ($NHV_{CZ}/NHV_{DIL}$) to satisfy regulatory requirements. In another example, a maximum permissible value constraint can be imposed upon the smoke yield (SY) to satisfy regulatory requirements.

In a further example, a maximum permissible value constraint can be imposed upon the volumetric flow rates of the supplemental fuel gas(es) 122 and/or the assist gas 126 in order to reduce flaring costs. Traditionally, flare operators can add too much steam/air assist gas 126 to suppress smoke and cool the flare tip at the expense of flare combustion efficiency (CE) and destruction removal efficiency (DRE).

In one embodiment, the models can be solved for the set points of the flow rates of the supplemental gas(es) 122 and/or and the assist gas 126 that yield the target combustion efficiency (CE), alone or in combination with the one or more predetermined constraints. Any methodologies suitable for solving systems of equations (e.g., the first, second, and third models) can be employed. Suitable initial conditions for the flow rate of the supplemental fuel gas(es) 122 and the assist gas 126 (e.g., either steam or air) can be assumed. The flow rate of the flare gas 104 is given by the measured value. This reflects the understanding that the flare system 402 does not regulate the flow of the flare gas 104.

Embodiments of the target combustion efficiency (CE) can adopt a variety of forms. In one aspect, the target combustion efficiency (CE) can be a global maximum. That is, the models are employed to determine the flow rates of the supplemental fuel gas(es) 122 and/or the flow rate of the assist gas(es) 126 that achieve the highest (maximum) estimated combustion efficiency (CE), regardless of the attendant values of the second net heating value ($NHV_{CZ}$), the smoke yield (SY), the flow rate of the supplemental fuel gas(es) 122, or the flow rate of the assist gas(es) 126.

In another aspect, the target combustion efficiency (CE) can be a constrained maximum. That is, the models are employed to determine the flow rates of the supplemental fuel gas(es) 122 and/or the flow rate of the assist gas(es) 126 that achieve the highest (maximum) estimated combustion efficiency (CE), while satisfying the one or more predetermined constraints placed upon the second net heating value ($NHV_{CZ}$), the smoke yield (SY), the flow rate of the supplemental fuel gas(es) 122, or the flow rate of the assist gas(es) 126.

In a further embodiment, the target combustion efficiency (CE) can be a predetermined minimum value. That is, the models are employed to determine the flow rates of the supplemental fuel gas(es) 122 and/or the flow rate of the assist gas(es) 126 that provide an estimated combustion efficiency (CE) greater than or equal to the predetermined minimum value. The predetermined minimum combustion efficiency (CE) can be determined alone or in combination with the one or more predetermined constraints.

In operation 610, the emissions estimator 114 can be further configured to determine a difference between the measured volumetric flow rates for each of the supplemental gas(es) 122 and the assist gas 126 and its corresponding determined set point. A predetermined tolerance amount corresponding to each of the differences can be maintained by the data storage device 120 and retrieved by the emissions estimator 114. When a determined difference for one of the volumetric gas flow rates (e.g., the supplemental gas(es) 122 or the assist gas(es) 126) is greater than its corresponding predetermined tolerance amount, the emissions estimator 114 can generate and output at least one command signal for receipt by the gas flow regulator 410 for that gas flow. Upon receipt, that gas flow regulator 410 can actuate (e.g., open or close) to adjust the volumetric flow rate the gas flowing therethrough to reduce the determined difference below the predetermined tolerance amount.

Certain embodiments are discussed herein in the context of volumetric flow rate. However, alternative embodiments can employ other types of flow rates, such as mass flow rate, without limit.

Exemplary technical effects of the methods, systems, and devices described herein include, by way of non-limiting example determination of flow rates of flare gas, supplemental gas, and assist gas that maximize combustion efficiency (CE) within predetermined constraints for net heating value in the combustion zone ($NHV_{CZ}$) and smoke yield (SY). In one aspect, the models employs live (e.g., real-time) data and can be changed as process conditions and/or environmental conditions change. As a result, the determined combustion efficiency and total emissions estimates can exhibit greater accuracy, as compared to corresponding estimates based upon models that employ static process conditions and/or environmental conditions as inputs. In another aspect, the process conditions and environmental conditions used as inputs to the selected model can be measured using commonly deployed online sensors, avoiding the need for costly upgrades to existing flare equipment. In a further aspect, the volumetric flow rate control set points can be determined continuously or on-demand as compared to other methodologies (e.g., light-based techniques) that are not always available due to weather conditions.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. "Approximately," "substantially, or "about" can include numbers that fall within a range of 1%, or in some embodiments within a range of 5% of a number, or in some embodiments within a range of 10% of a number in either direction (greater than or less than the number) unless otherwise stated or otherwise evident from the context (except where such number would impermissibly exceed 100% of a possible value). Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method of controlling a flare, comprising:
   maintaining, by a memory:
   a first model configured to estimate a net heating value of a combustion gas within a combustion zone of a flare based on one or more operating parameters comprising measured volumetric flow rates of a flare gas, a supplemental fuel gas, and an assist gas;
   a second model configured to estimate a combustion efficiency of the combustion gas based on the one or more operating parameters; and
   a third model configured to estimate a smoke yield resulting from combustion of the combustion gas based on the one or more operating parameters; and
   performing, by at least one processor in communication with the memory, a plurality of operations including:
   receiving the one or more operating parameters;

receiving, from the memory, the first, second, and third models;

determining a set point for respective volumetric flow rates of at least one of the supplemental fuel gas or the assist gas, based upon the first model, the second model, and the third model, that achieves a target combustion efficiency; and determining a difference between each determined set point and its corresponding measured volumetric flow rate for the supplemental fuel gas and the assist gas, wherein, responsive to the difference being greater than a predetermined tolerance amount, the at least one processor is further configured to output at least one command signal operative to command a flow regulator to adjust the volumetric flow rate of at least one of the supplemental fuel gas, or the assist gas to reduce the difference below the predetermined tolerance amount.

2. The method of claim 1, wherein the assist gas is steam or air.

3. The method of claim 1, wherein the target combustion efficiency at the determined set points is a maximum combustion efficiency.

4. The method of claim 3, wherein at least one of the estimated smoke yield and the estimated net heating value at the determined set points satisfies a predetermined constraint.

5. The method of claim 3, wherein at least one of the volumetric flow rate of the supplemental fuel gas or the volumetric flow rate of the assist gas is constrained within a predetermined range.

6. The method of claim 1, wherein the one or more operating parameters further comprise a speed of sound in the flare gas, a pressure of the flare gas, and a temperature of the flare gas.

7. The method of claim 1, wherein the second and third models are further configured to use the estimated net heating value estimated by the first model.

8. The method of claim 1, wherein the third model is selected, by the at least one processor, from an empirical model or a non-parametric machine learning model.

9. A system for controlling a flare, comprising:
a memory configured to maintain:
a first model configured to estimate a net heating value of a combustion gas within a combustion zone of a flare based on one or more operating parameters comprising measured volumetric flow rates of a flare gas, a supplemental fuel gas, and an assist gas;
a second model configured to estimate a combustion efficiency of the combustion gas based on the one or more operating parameters; and
a third model configured to estimate a smoke yield resulting from combustion of the combustion gas based on the one or more operating parameters; and
at least one processor in communication with the memory and configured to perform a plurality of operations including:
receiving the one or more operating parameters;
receiving the first, second, and third models from the memory;
determining a set point for respective volumetric flow rates of at least one of the supplemental fuel gas or the assist gas, based upon the first model, the second model, and the third model, that achieves a target combustion efficiency; and
determining a difference between each determined set point and its corresponding measured volumetric flow rate for the supplemental fuel gas and the assist gas,
wherein, responsive to the difference being greater than a predetermined tolerance amount, the at least one processor is further configured to output at least one command signal operative to command a flow regulator to adjust the volumetric flow rate of at least one of the supplemental fuel gas or the assist gas to reduce the difference below the predetermined tolerance amount.

10. The system of claim 9, wherein the assist gas is steam or air.

11. The system of claim 9, wherein the target combustion efficiency at the determined set points a maximum combustion efficiency.

12. The system of claim 11, wherein at least one of the estimated smoke yield and the estimated net heating value at the determined set points satisfies a predetermined constraint.

13. The system of claim 11, wherein at least one of the volumetric flow rate of the supplemental fuel gas or the volumetric flow rate of the assist gas is constrained within a predetermined range.

14. The system of claim 9, wherein the one or more operating parameters further comprise a speed of sound in the flare gas, a pressure of the flare gas, and a temperature of the flare gas.

15. The system of claim 9, wherein the second and third models are further configured to use the estimated net heating value estimated by the first model.

16. The system of claim 9, wherein the third model is selected, by the at least one processor, from an empirical model or a non-parametric machine learning model.

* * * * *